(12) United States Patent
Nakano et al.

(10) Patent No.: US 10,935,171 B1
(45) Date of Patent: Mar. 2, 2021

(54) CONNECTING MECHANISM AND TUBE ASSEMBLY

(71) Applicant: TOFLE CO., INC., Osaka (JP)

(72) Inventors: Katsutoshi Nakano, Suita (JP); Shin Kinoshita, Osaka (JP)

(73) Assignee: TOFLE CO., INC., Osaka (JP)

( * ) Notice: Subject to any disclaimer, the term of this patent is extended or adjusted under 35 U.S.C. 154(b) by 0 days.

(21) Appl. No.: 16/833,772

(22) Filed: Mar. 30, 2020

(30) Foreign Application Priority Data

Sep. 30, 2019 (JP) ................................ 2019-179271
Mar. 9, 2020 (JP) ................................ 2020-040133

(51) Int. Cl.
*F16L 11/00* (2006.01)
*F16L 11/20* (2006.01)
*F16L 11/02* (2006.01)
*F16L 11/15* (2006.01)

(52) U.S. Cl.
CPC ............... *F16L 11/20* (2013.01); *F16L 11/02* (2013.01); *F16L 11/15* (2013.01)

(58) Field of Classification Search
CPC .. F16L 11/20; F16L 11/02; F16L 11/15; F16L 21/007; F16L 21/05; F16L 39/02
USPC .................. 138/109, 121, 122, 114, 125, 126
See application file for complete search history.

(56) References Cited

U.S. PATENT DOCUMENTS

| | | | |
|---|---|---|---|
| 1,793,887 A * | 2/1931 | White | F16L 33/26 285/222.5 |
| 1,809,874 A * | 6/1931 | Stoner | F16L 33/26 285/222.5 |
| 2,150,471 A * | 3/1939 | Van Vulpen | F16L 33/26 285/222.4 |
| 2,383,733 A * | 8/1945 | Parker | F16L 33/224 138/126 |
| 2,786,697 A * | 3/1957 | Rescheneder | F16L 17/025 277/615 |
| 4,567,916 A * | 2/1986 | Antal | F16L 33/01 138/104 |
| 4,836,580 A * | 6/1989 | Farrell | F16L 37/0985 285/24 |

(Continued)

FOREIGN PATENT DOCUMENTS

| | | |
|---|---|---|
| JP | 53-53111 | 12/1978 |
| JP | 63-37891 U | 3/1988 |

(Continued)

OTHER PUBLICATIONS

Decision to Grant in JP 2019-179271, dated Jan. 14, 2020, and English translation.

*Primary Examiner* — James F Hook
(74) *Attorney, Agent, or Firm* — Buchanan Ingersoll & Rooney PC

(57) ABSTRACT

A connector assembly for connecting a corrugated tube with a braid mounted on the periphery of the hose to a metal connector, comprises an inner sleeve mounted on the corrugated tube, and an outer sleeve mounted on the inner sleeve, the inner and outer sleeve cooperating with each other to hold the braid between the inner and outer sleeves. The inner and outer sleeves have respective inner and outer tapered surfaces. One of the inner and outer tapered surfaces has one or more portions projecting toward the other of the inner and outer tapered surfaces.

7 Claims, 8 Drawing Sheets

(56) References Cited

U.S. PATENT DOCUMENTS

| | | | | |
|---|---|---|---|---|
| 4,895,185 A | * | 1/1990 | Champleboux | E21B 33/1277 |
| | | | | 138/109 |
| 4,988,128 A | * | 1/1991 | Do | B29C 70/86 |
| | | | | 285/222.1 |
| 5,061,826 A | * | 10/1991 | MacCulloch | G02B 6/4427 |
| | | | | 138/109 |
| 5,167,533 A | * | 12/1992 | Rauwolf | H01R 9/0521 |
| | | | | 439/583 |
| 5,255,974 A | * | 10/1993 | Signer | B01F 5/061 |
| | | | | 138/108 |

FOREIGN PATENT DOCUMENTS

| | | |
|---|---|---|
| JP | 3040424 U | 8/1997 |
| JP | 2000-46276 | 2/2000 |
| JP | 2000320737 A | 11/2000 |

\* cited by examiner

CONNECTING MECHANISM AND TUBE ASSEMBLY

TECHNICAL FIELD

The present invention relates to a connecting mechanism. In particular, the present invention relates to a connecting mechanism for connecting an end of a corrugated tube covered with a braid to a metal connector. Also, the present invention, relates to a tube assembly comprising a corrugated tube covered with a braid.

BACKGROUND

Japanese Utility Model registration No. 3040424 discloses a connecting mechanism for connecting an end of a corrugated tube to a circular flange. In this mechanism, the end of the corrugated tube supports a sleeve made of sleeve halves. The sleeve has an outer tapered surface while the flange has an inner tapered surface corresponding to the outer tapered surface of the sleeve. The outer tapered surface of the sleeve and the inner tapered surface of the flange are designed to cooperate with each other to hold an end of wire braid. With this connecting mechanism, as the flange moves toward an opposed mating flange, the end of the braid becomes to be firmly held or grasped between the inner and outer tapered surfaces, allowing an axial tensile force applied to the corrugated tube to be effectively transmitted to the flange.

PRIOR ART DOCUMENT

Japanese Utility Model Registration No. 3040424

SUMMARY OF THE INVENTION

The present invention is to improve the above-described connecting structure in which the braid is held between the inner and outer tapered surfaces and thereby provide an improved connecting mechanism capable of holding the blade in a stable manner between the inner and outer tapered surfaces.

For this purpose, a connecting mechanism for connecting a corrugated tube with a braid covering the corrugated tube to a metal connector according to one embodiment of the invention comprises
an inner sleeve mounted on the corrugated tube; and
an outer sleeve mounted on the inner sleeve, the outer sleeve cooperating with the inner sleeve to hold the braid between the inner sleeve and the outer sleeve;
wherein
the inner sleeve has an inner tapered surface portion that tapers in a direction away from a distal end of the corrugated tube,
the outer sleeve has an outer tapered surface portion that tapers in a direction away from the distal end of the corrugated tube, and
one of the inner tapered surface portion and the outer tapered surface portion has one or more portions projecting toward the other of the inner tapered surface portion and the outer tapered surface portion.

A tube assembly according to an embodiment of the invention comprises
a corrugated tube;
a braid covering an outer periphery of the corrugated tube;
an inner sleeve fitted in an annular outer groove formed at a distal end of the corrugated tube; and
an outer sleeve mounted on the inner sleeve;
wherein
the inner sleeve has an outer peripheral surface opposing the outer sleeve;
the outer sleeve has an inner peripheral surface opposing the inner sleeve;
the outer peripheral surface of the inner sleeve has an inner tapered surface which tapers in a direction away from the distal end of the corrugated tube;
the inner peripheral surface of the outer sleeve has an outer tapered surface which tapers in a direction away from the distal end of the corrugated tube; the outer tapered surface of the inner sleeve and the inner tapered surface of the outer sleeve cooperates with each other to hold an end of the braid between the inner tapered surface and the outer tapered surface; and
one of the outer tapered surface and the inner tapered surface has one or more portions projecting toward the other of the outer tapered surface and the inner tapered surface.

According to the connecting mechanism and the tube assembly, the braid is firmly held at a narrow annular strip-like or line-like region in the vicinity of a top portion of the projection or narrow annular strip-like or line-like regions in the vicinities of the top portions of the projections, ensuring the braid to be held between the inner and outer sleeves in a stable manner even when a high pressure is applied inside the corrugated tube, which in turn prevents the corrugated tube from being damaged.

DETAILED DESCRIPTION OF THE PREFERRED EMBODIMENTS

With reference to the accompanying drawings, discussions will be made to several embodiments of the present invention.

First Embodiment

Figure 1:
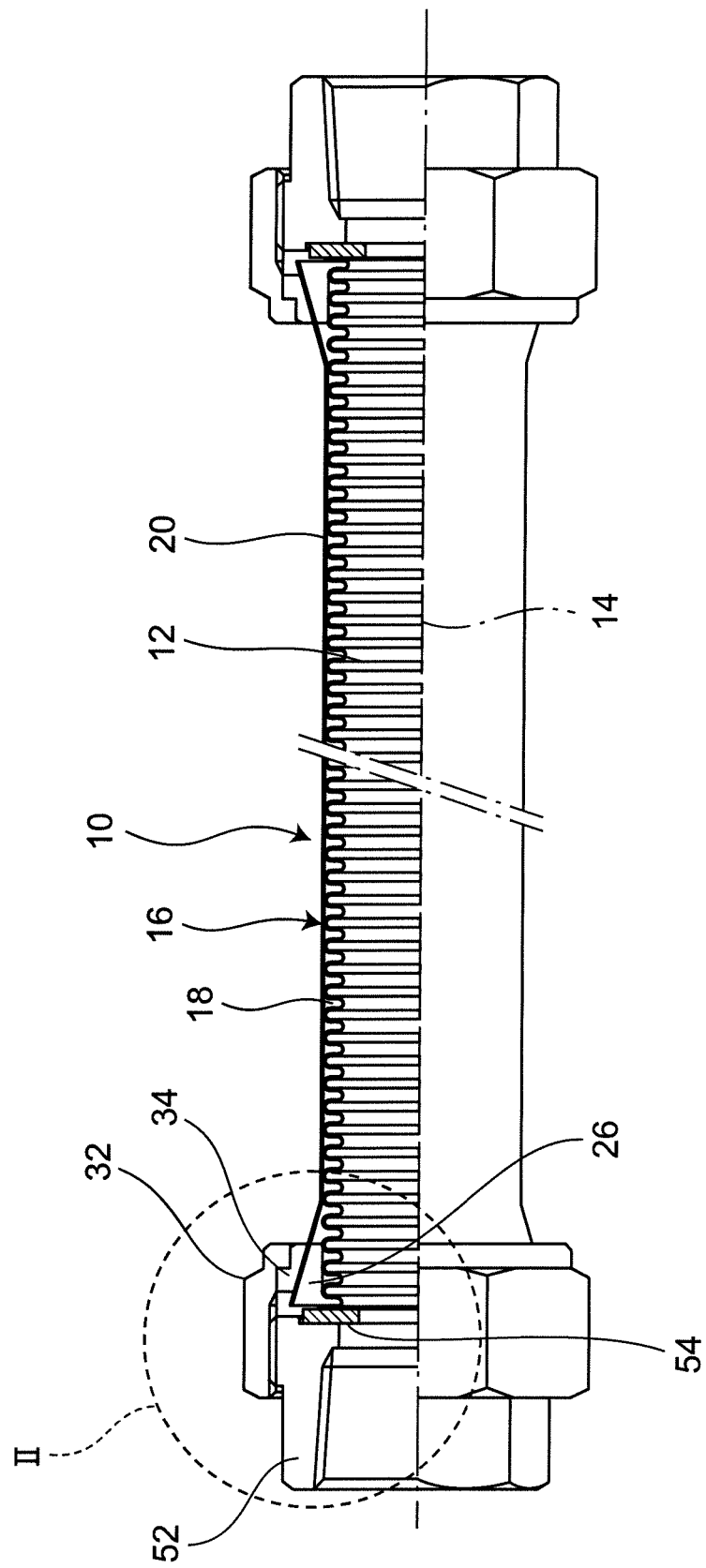
FIG. 1 is a partially cut-away side elevation of a tube assembly according to a first embodiment of the invention.
Figure 2:
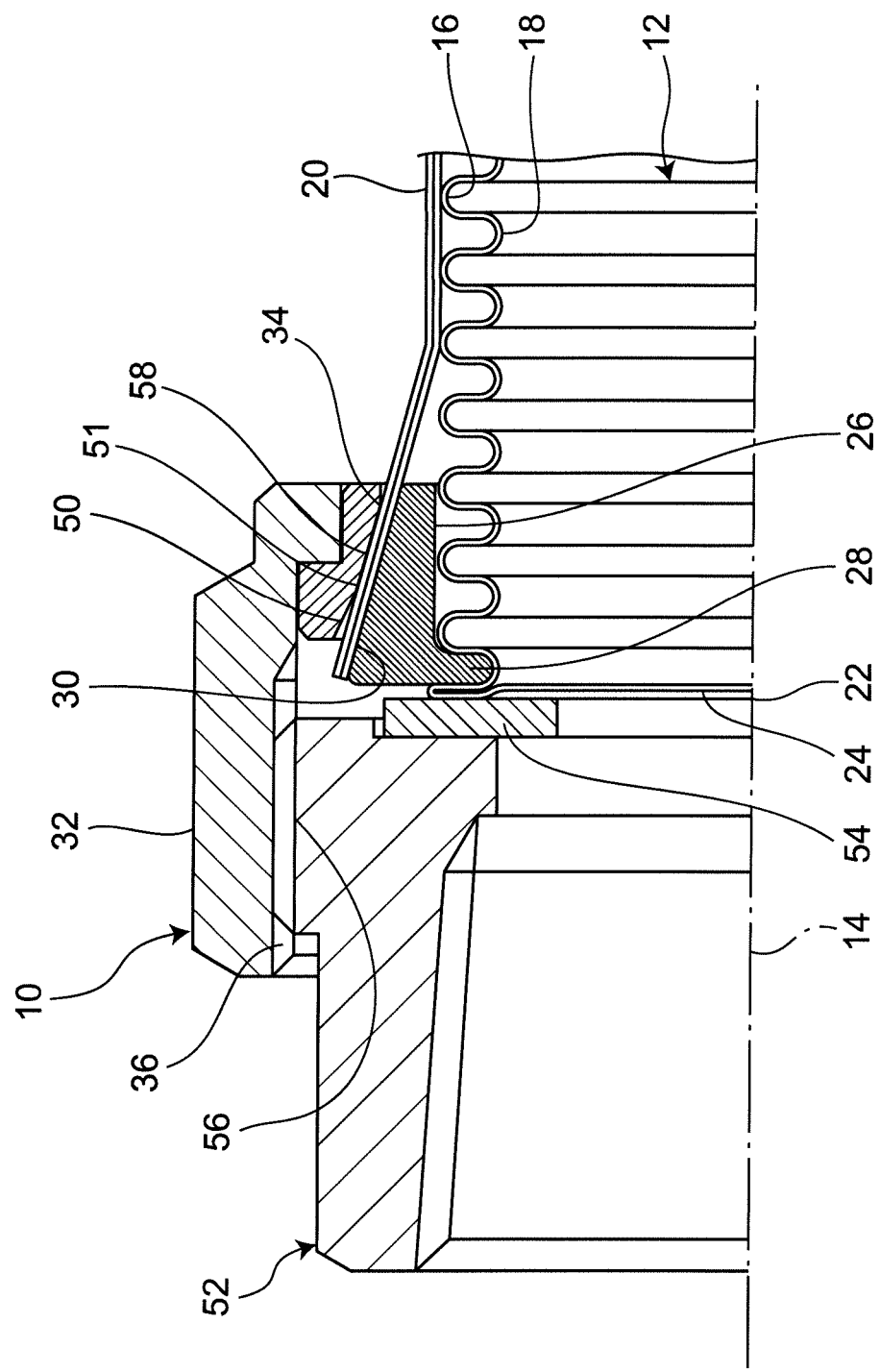
FIG. 2 is a partial enlarged cross section of the tube assembly of FIG. 1.

FIGS. 1 and 2 show a tube assembly according to a first embodiment of the invention. The tube assembly 10 has a flexible corrugated tube 12 or hose made of a suitable metal. The corrugated tube 12, which has a longitudinal central axis 14, comprises large diameter portions (mountains) 16 and small diameter portions (valleys and grooves) 18 formed alternately in a direction along the longitudinal central axis 14. An outer periphery of the corrugated tube 12 is covered with a cylindrical metal braid 20. The braid 20 is manufactured by weaving stainless steel wires or strips.

A distal end of the corrugated tube 12 has a sealing portion 24. The sealing portion 24 is formed by compressing one or more large diameter portions 16 or mountains in the axial direction.

Figure 3:
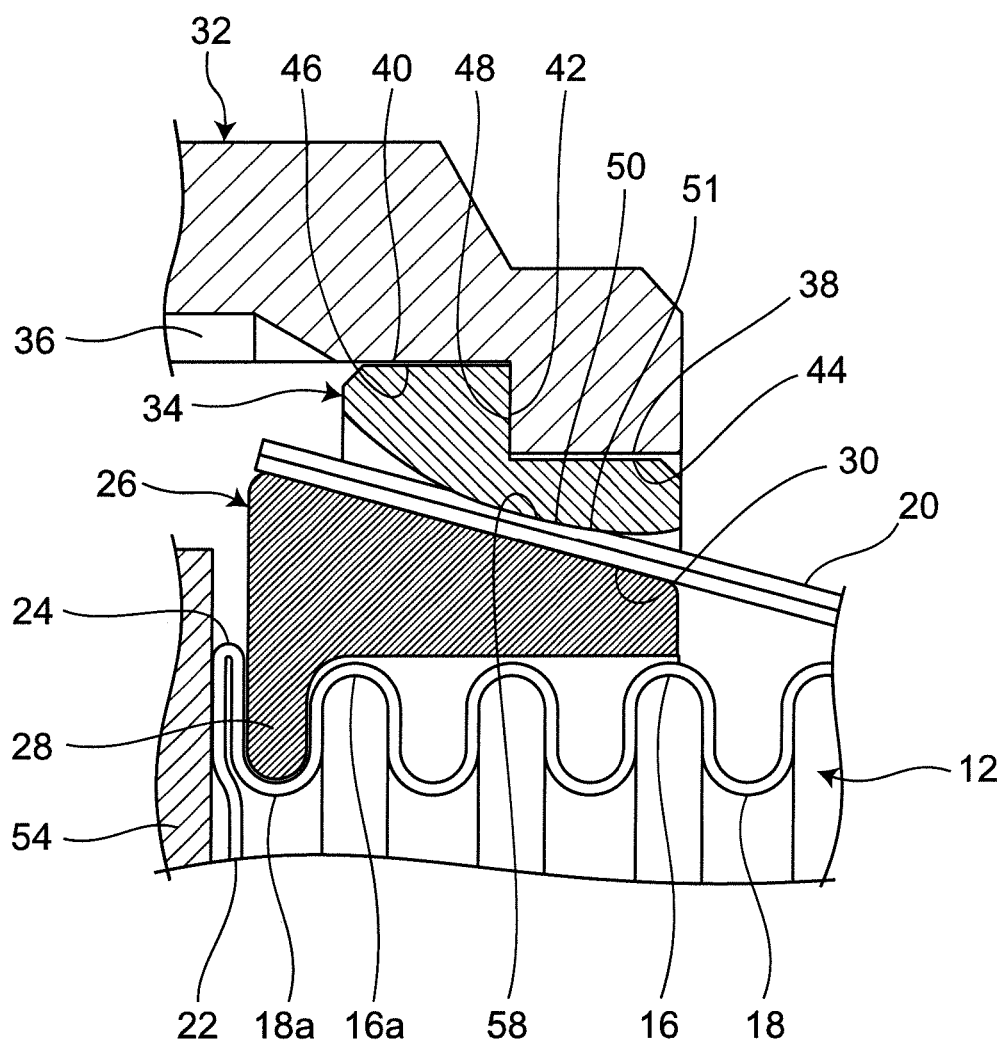
FIG. 3 is a partial enlarged cross section of the tube assembly of FIG. 2.

The distal end portion of the corrugated tube 12 is surrounded by a cylindrical inner sleeve 26 made of a suitable metal. The inner sleeve 26 has an annular portion projecting radially inwardly from the distal inner peripheral portion, adjacent to the sealing portion 24, of the inner sleeve 26. As shown in the drawings, the annular projected portion 28 has a shape and size capable of being fitted in the small diameter portion or groove 18a between the sealing portion 24 and the neighborhood large diameter portion 16a (see FIG. 3). The outer peripheral surface of the inner sleeve 26 has a cylindrical inner tapered surface 30. An outer diameter of the tapered surface 30 decreases gradually in a direction away from the distal end of the inner sleeve 26 along the direction of the central axis 14.

In a preferred embodiment, the inner sleeve 26 is formed by combining a pair of sleeve halves manufactured by cutting a cylindrical tapered tube along a longitudinal cross sectional plane including the central axis thereof into two halves, allowing the inner sleeve 26 to be fitted on the corrugated tube 12 after the formation of the sealing portion 24.

An outer cylindrical metal connector 32 and a cylindrical outer sleeve 34 mounted inside the metal connector 32, both made of suitable metals, are mounted on the inner sleeve 26.

In the embodiment, the metal connector 32 is a union nut. The metal connector 32 has a distal large diameter inner cylindrical surface portion 36 and a proximal small diameter inner cylindrical surface portion (annular projection) 38. The distal large diameter cylindrical inner surface portion 36 is formed with an inner thread. The proximal small diameter cylindrical inner surface portion 38 forms an inwardly projected annular projection of the metal connector 32. The inner surface of the metal connector 32 further has a large diameter cylindrical inner surface portion 40 between the large diameter cylindrical inner surface portion 36 and the proximal small diameter cylindrical inner surface portion 38. The large diameter cylindrical inner surface portion 40 has an inner diameter larger than that of the proximal small diameter cylindrical inner surface portion 38. A radially extending annular engagement surface portion (restriction) 42 is formed between the small diameter cylindrical inner surface portion 38 and the large diameter cylindrical inner surface portion 40.

The outer peripheral surface of the outer sleeve 34 has a proximal small diameter cylindrical outer surface portion 44 having a diameter slightly smaller than that of the small diameter cylindrical inner surface portion 38 of the metal connector 32, a distal large diameter cylindrical outer surface portion 46 having a diameter slightly smaller than that of the large diameter cylindrical inner surface portion 40 of the metal connector 32, and an annular engagement surface portion 42 (restriction) extending radially between the small diameter cylindrical outer surface portion 44 and the large diameter cylindrical outer surface portion 46.

The inner peripheral surface of the outer sleeve 34 has a cylindrical tapered outer surface portion 50. The inner diameter of the cylindrical tapered outer surface portion 50 decreases in the axial direction from the distal end toward proximal end of the outer sleeve 34. As shown in detail in FIG. 3, the outer tapered surface portion 50 has a cylindrical inwardly curved or projected surface portion 51. The cylindrical curved surface 51, projecting inwardly toward the inner tapered surface 30 of the sleeve 26, extends substantially the entire region from the distal end to the proximal end of the inner surface of outer sleeve 34.

In manufacturing the tube assembly 10 by combining the structural components described above, before mounting inner sleeve 26 on the corrugated tube 12, the outer sleeve 34 and the meal connector 32 are mounted on one end of the corrugated tube 12 covered with the braid 20 and retained at a position away from the distal end of the corrugated tube. The inner sleeve 26, i.e., two sleeve halves, are positioned between the corrugated tube 12 and the braid 20 with the annular projection 28 fitted in the distal-most small diameter portion (valley or groove) 18a adjacent the sealing portion 24. In this condition, the outer sleeve 34 is moved distally to position the braid 20 between the inner sleeve 26 and the outer sleeve 34. Finally, the metal connector 32 is moved distally so that the proximal small diameter cylindrical surface portion 44 and the distal large diameter cylindrical surface portion 46 of the outer sleeve 34 take respective positions outside the proximal small diameter portion 38 and the large diameter cylindrical surface portion 40 of the metal connector 32.

For connecting the metal connector (union nut) 32 with an associated union screw 52 (see FIG. 1), a disc gasket 54 is positioned on the distal end of the corrugated tube 12, adjacent the distal seal 24 of the corrugated tube 12. As shown, the union screw 52 has an outer thread 56 engageable with the inner thread 36 of the union nut 32, so that the outer thread 56 is threaded with the inner thread 36. During this process, as the union screw 52 is threaded into the union nut 32, the engagement surface (restriction) 42 of the union nut 32 approaches the associated engagement surface 48 of the outer sleeve 48. Further threading of the union screw 52 into the union nut 32 causes the outer sleeve 34 to force the inner sleeve 26 distally, so that the braid 22 is firmly held between the outer tapered surface portion 50 of the outer sleeve 34 and the inner tapered surface 30 of the inner sleeve 26. The outwardly curved outer tapered surface portion 50 forces the braid 20 only in a narrow annular strip-like or line-like region 58 (see FIG. 3) adjacent the top portion of the curved surface, rather than the entire surface of the outer tapered surface portion 50. This prevents the force acting on the braid 20 between the inner tapered surface 30 and the outer tapered surface 50 concentrates on a small region in the vicinity of the top portion of the curved surface 51 and does not distribute into the entire tapered surface. This increases a holding force of the braid 20 between the inner sleeve 26 and the outer sleeve 34, so that the braid 20 is firmly held between the inner the outer sleeves 26 and 34 in a stable manner. This ensures that the braid 20 is held stably between the inner and outer sleeves even when a large tension force is applied to the braid 20 in the axial direction.

As the union screw 52 engages with the union nut 32, the inner sleeve 26 is forced toward the union nut 52, causing the gasket 54 to be retained between the distal sealing portion 24 of the corrugated tube 12 and the union screw 52 to make a seal between the distal sealing portion 24 and the union screw 52.

The sealing method is not limited thereto. For example, the seal may be formed by pressing a distal end of the corrugated tube 12 against a mating member.

Embodiments and Comparative Examples

Gas-tight and destructive tests were conducted to the above-discussed tube assemblies with outer sleeves each having an inwardly projected inner peripheral curved and tapered surface and to comparative tube assemblies with outer sleeves each having a straight inner peripheral tapered surface.

In the gas-tight test, the union screw and the union nut were tightened with a tightening load of 100 N/m. A compressive pressure of 1.6 MPa was applied in the interior of the corrugated tube and the assemblies were maintained under water for three minutes to observe air leakage. No air leakage was observed for the tube assemblies according to the embodiment and the comparative example.

In the destructive test, the pressure applied in the interior of the corrugated tube was gradually increased to determine the load at which the braid was disengaged from between the inner and outer tapered surfaces (braid destructive load) or the load at which the tube assembly was broken (corrugated tube destructive load). As described above, notwithstanding that the union screw and nut were tightened with the same force, the braid disengaged at 16.6 MPa in the tube assembly according to the embodiment while the braid disengaged at 11.5 MPa in the tube assembly of comparative example.

The test results show that the tube assembly with a combination of the straight inner tapered surface and the curved outer tapered surface retained the braid more firmly than the tube assembly with a combination of the straight inner tapered surface and the straight outer tapered surface.

Figure 4:
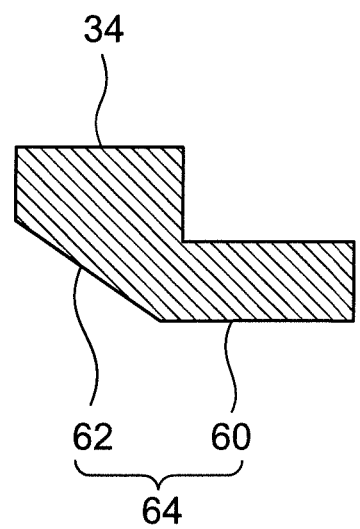
FIG. 4 is a partial enlarged cross section of an outer sleeve according to a modification of the first embodiment.
Figure 5:
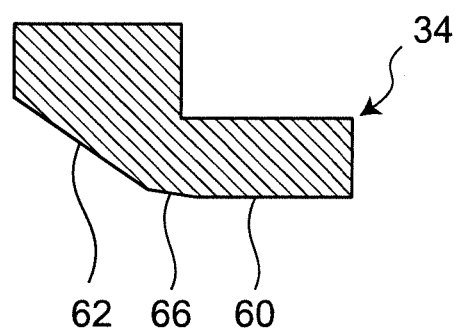
FIG. 5 is a partial enlarged cross section of an outer sleeve according to another modification of the first embodiment.

Although the entire inner peripheral surface of the outer sleeve 34 is projected and curved toward the inner sleeve 26 to form the curved surface in the first embodiment, as shown in FIG. 4 the inner peripheral surface of the outer sleeve may have a proximal straight non-tapered surface portion 62 and a distal straight tapered surface portion 62, connected together at the distal end of the proximal non-tapered surface portion 60 and the proximal end of the distal tapered surface portion 62, to form an angled surface 64. Instead, as shown in FIG. 5, a straight tapered surface portion 66 or a projected and curved surface portion (not shown) is formed between the distal end of the proximal non-tapered surface portion 60 and the proximal end of the distal straight tapered surface portion 66.

Also, although the inner peripheral surface of the outer sleeve 34 has a projected and curved surface portion in the first embodiment, the outer periphery surface of the inner sleeve 26, opposing the outer sleeve, may have a projected and curved surface portion or the angled surface portion instead.

The curved tapered surface portion may also be made not only on the outer sleeve but also on the inner sleeve. In this embodiment, preferably a curvature of the curved tapered surface portion of the inner sleeve is greater than that of the curved taper of the outer sleeve.

Second Embodiment

Figure 6:
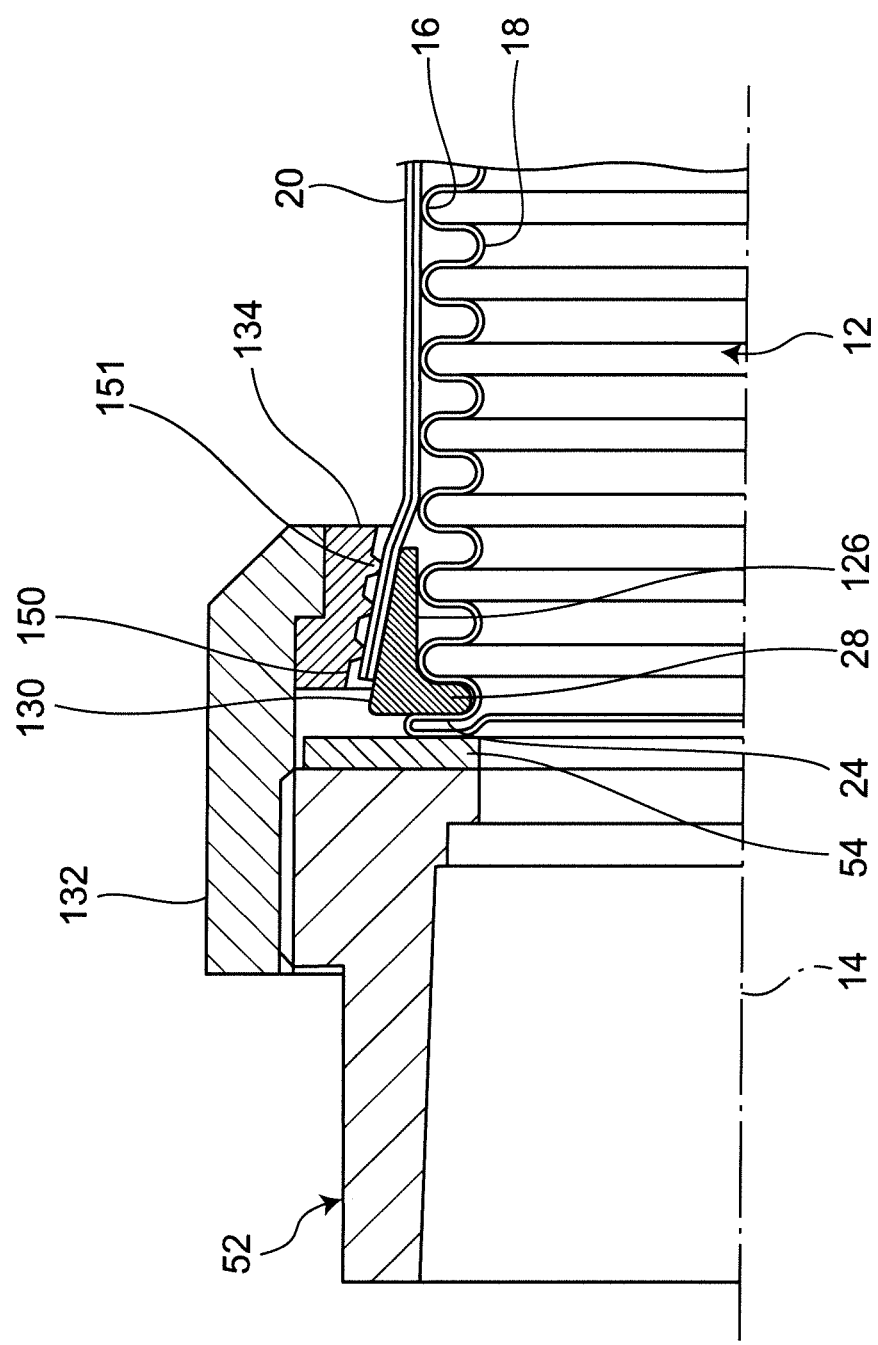
FIG. 6 is a partial cross section of a tube assembly according to the second embodiment of the invention.
Figure 7:
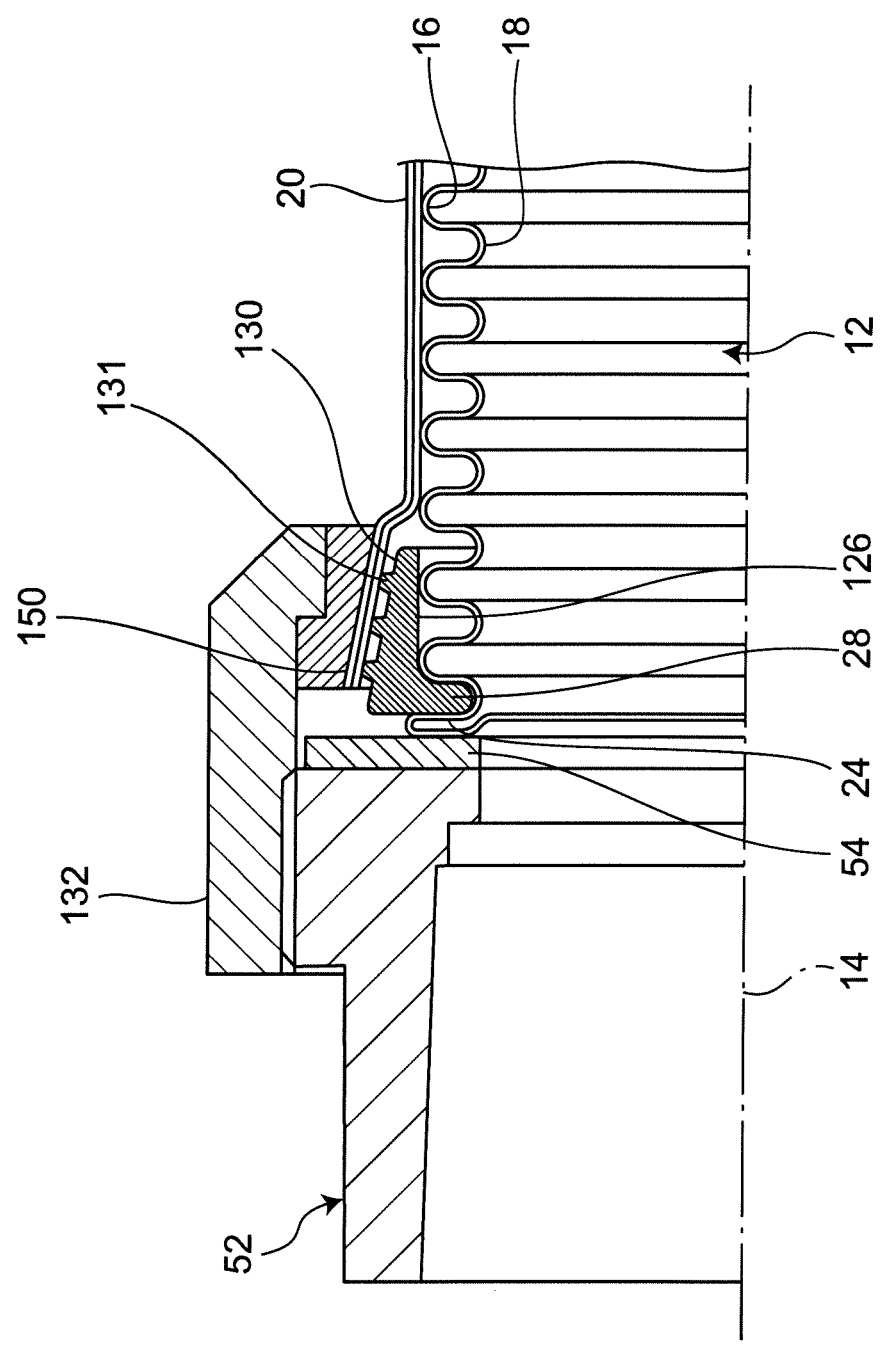
FIG. 7 is a cross section of a tube assembly according to a modification of the second embodiment of the invention.

Although in the previous embodiment 1 either of the cylindrical tapered surface portion 50 of the outer sleeve 34 or the cylindrical tapered surface portion 30 of the inner sleeve 26 is formed with one annular projected and curved surface portion or projected mountain-like surface portion, as shown in FIG. 6 two or more annular projections (for example, projected and curved surface portions or projected mountain-like surface portions) 151 may be formed on the cylindrical inner tapered surface 150 of the outer sleeve 134 at intervals in the axial direction. Also, as shown in FIG. 7 two or more annular projections (for example, projected and curved surface portions or projected mountain-like surface portions) 131 may be formed on the cylindrical outer tapered surface 130 of the inner sleeve 126 instead.

In the second embodiment, the intervals between the projections 151 and 131 do not need to be constant. For example, in one embodiment in which three projections are provided as shown in FIGS. 6 and 7, a distance between the distal and intermediate annular projections may be larger than, less than, or the same as a distance between the proximal and intermediate annular projections.

The height of the projection 131 does not need to be the same as that of projection 151. For example, one of three projections (i.e., distal, proximal and intermediate projections) may be higher or lower than others.

In any event, the intervals and the heights are determined depending on various conditions such as the diameter of the corrugated tube and the rigidity of the braid so as to attain a most appropriate braid holding property.

Third Embodiment

Figure 8:
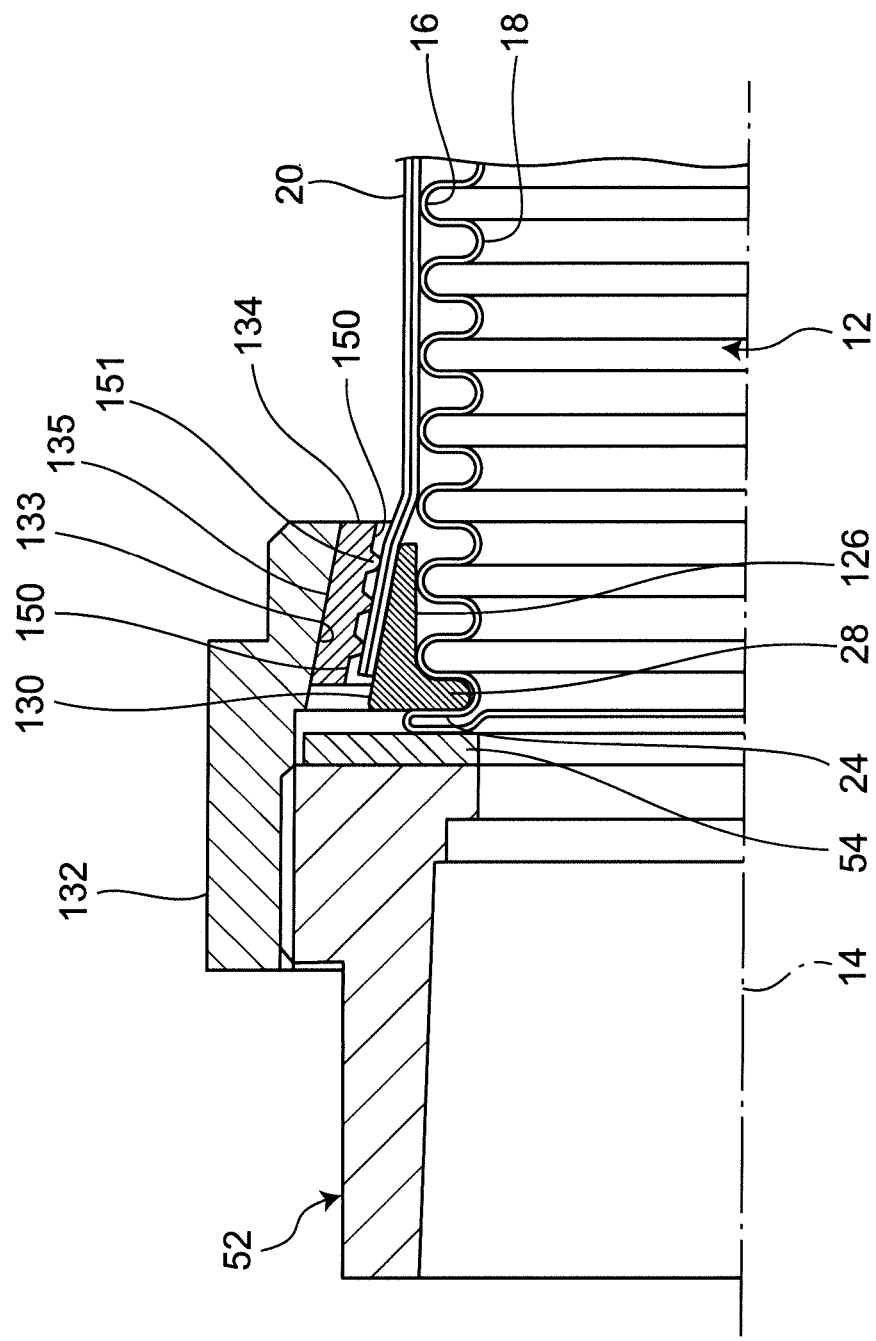
FIG. 8 is a partial cross section of a tube assembly according to the third embodiment of the invention.
Figure 9:
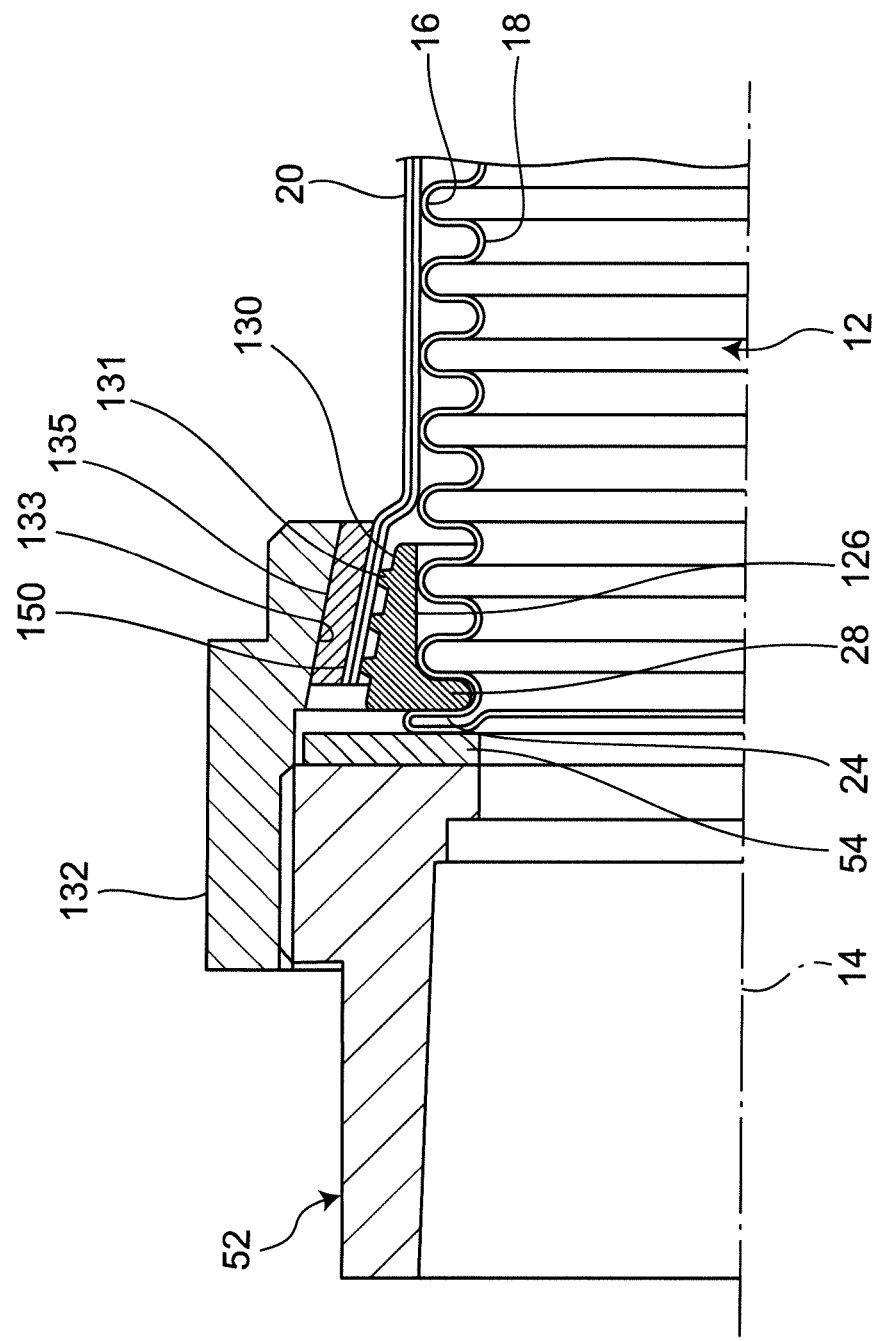
FIG. 9 is a partial cross section of a tube assembly according to a modification of the third embodiment of the invention.

In the above-described embodiment 1, the outer peripheral surface of the outer sleeve 34 is formed with the small diameter cylindrical surface portion 44, the large diameter cylindrical surface portion 46, and the vertical engagement surface portion 48 connecting the small and large diameter cylindrical surface portions 44 and 46, while the associated inner peripheral surface of the metal connector 32 is formed with the small diameter cylindrical surface portion 38, the large diameter cylindrical surface portion 40, and the vertical engagement surface portion 42 connecting the small and large diameter surface portions 38 and 40, and the annular projections 131 or 151 are pressed on the braid 20 by forcing the vertical engagement surface 42 of the metal connector 32 against the vertical engagement surface 48. Alternatively, in each of the first and second embodiments, as shown in FIGS. 8 and 9 the metal connector 132 and the outer sleeve 134 may be modified so that the outer peripheral surface of the outer sleeve 134 has an outer cylindrical tapered surface portion 135 of which diameter decreases in proportion to a distance away from the distal end of the outer sleeve 134 while the metal connector 132 has an inner cylindrical tapered surface portion 135 of which diameter decreases in proportion to a distance away from the distal end of the metal connector 132, allowing the cylindrical tapered surface portion 133 of the metal connector 132 to force the cylindrical tapered surface portion 135 of the outer sleeve 134, which eventually presses the cylindrical projections 131 and 151 against the braid 20.

Although in the first to third embodiments the outer sleeve and the metal connector are separate members, they may be integrated as a single element. In this embodiment, the cylindrical tapered surface portion of the metal connector (outer tapered surface) or the cylindrical tapered surface portion of the inner sleeve (inner tapered surface) has one or more annular projections.

Although in the first to third embodiments the projection or projections are formed on the entire region of the inner peripheral surface portion of the outer sleeve or the outer peripheral surface portion of the inner sleeve, they may be formed in a limited region of the inner or outer peripheral surface portion.

Although in the first to third embodiment, the metal connector is threaded metal component (for example, union nut), it may be a metal flange (for, circular flange).

The invention claimed is:

1. A connecting mechanism for connecting a corrugated tube with a braid covering the corrugated tube to a metal connector, comprising:
   an inner sleeve mounted on the corrugated tube; and
   an outer sleeve mounted on the inner sleeve, the outer sleeve cooperating with the inner sleeve to hold the braid between the inner sleeve and the outer sleeve;
   wherein
   the inner sleeve has an inner tapered surface portion that tapers in a direction away from a distal end of the corrugated tube,
   the outer sleeve has an outer tapered surface portion that tapers in a direction away from the distal end of the corrugated tube, and
   the outer tapered surface portion has an inwardly curved projected portion projecting toward the inner tapered surface portion, the inwardly curved projected portion extending substantially an entire region from a distal end to a proximal end of the outer tapered surface portion.

2. The connecting mechanism of claim 1, wherein the metal connector is a thread-type metal connector or a flange-type metal connector.

3. The connecting mechanism of claim 1, wherein the inwardly curved portion forms an arc in cross-section.

4. A tube assembly, comprising:
   a corrugated tube;
   a braid covering an outer periphery of the corrugated tube;
   an inner sleeve fitted in an annular outer groove formed at a distal end of the corrugated tube; and
   an outer sleeve mounted on the inner sleeve;
   wherein
   the inner sleeve has an outer peripheral surface opposing the outer sleeve;
   the outer sleeve has an inner peripheral surface opposing the inner sleeve;
   the outer peripheral surface of the inner sleeve has an inner tapered surface which tapers in a direction away from the distal end of the corrugated tube;
   the inner peripheral surface of the outer sleeve has an outer tapered surface which tapers in a direction away from the distal end of the corrugated tube; the inner tapered surface of the inner sleeve and the outer tapered surface of the outer sleeve cooperates with each other to hold an end of the braid between the inner tapered surface and the outer tapered surface; and
   the outer tapered surface has an inwardly curved projected portion projecting toward the inner tapered surface, the inwardly curved projected portion extending substantially an entire region from a distal end to a proximal end of the outer tapered surface portion.

5. The tube assembly of claim 4, further comprising:
   a metal connector mounted on the outer sleeve,
   wherein the outer sleeve and the metal connector have inner restriction and associated outer restriction, respectively, which cooperate to restrict the metal connector from moving toward the distal end of the corrugated tube relative to the outer sleeve.

6. The tube assembly of claim 4, wherein the metal connector is a thread-type metal connector or a flange-type metal connector.

7. The tube assembly of claim 4, wherein the inwardly curved portion forms an arc in cross-section.

* * * * *